R. L. LASH.
AUTOMATIC VALVE FOR FLUSH TANKS.
APPLICATION FILED DEC. 27, 1921.
1,420,713.  Patented June 27, 1922.
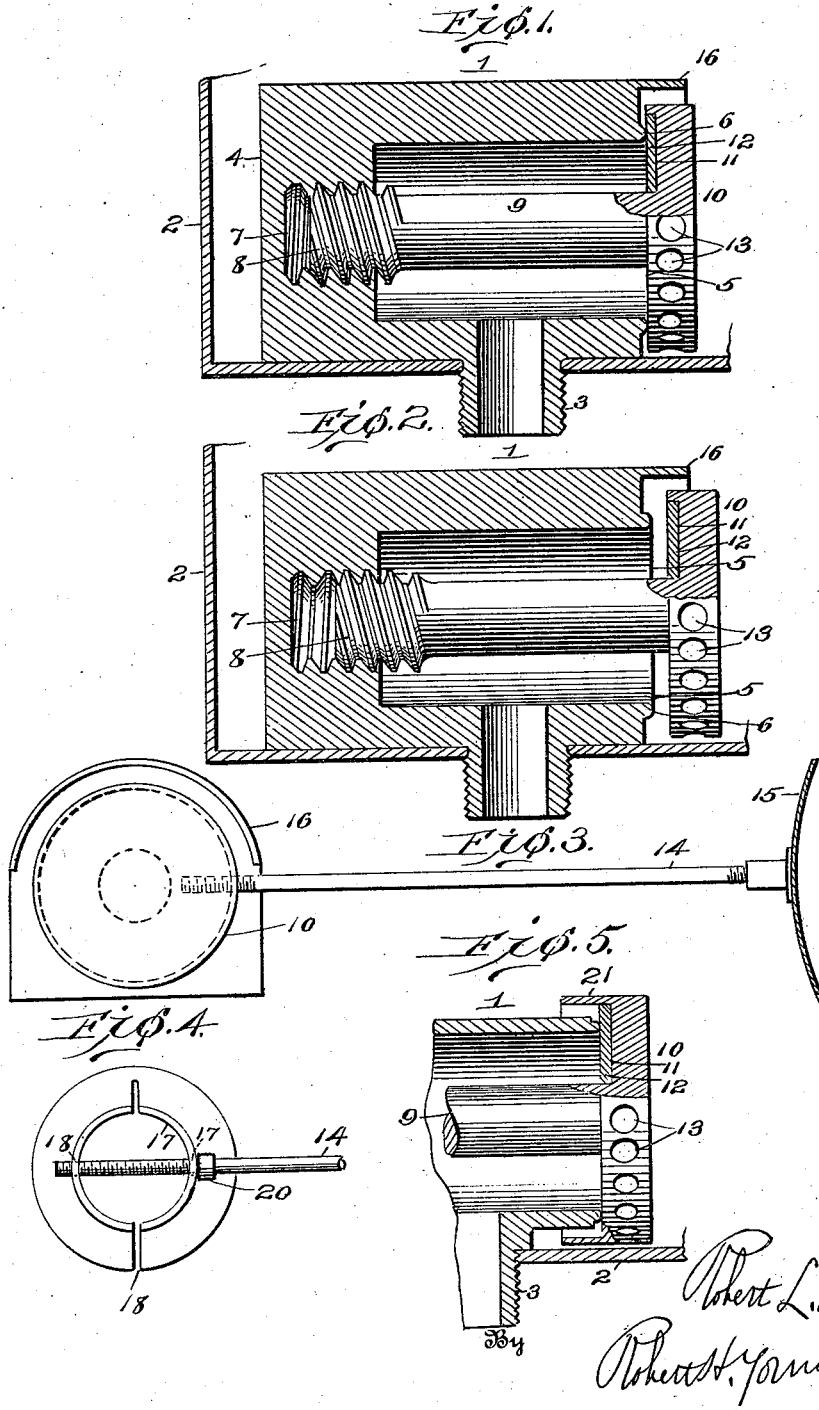

UNITED STATES PATENT OFFICE.

ROBERT L. LASH, OF NORFOLK, VIRGINIA, ASSIGNOR OF TWO-FIFTHS TO H. L. KANTER, OF NORFOLK, VIRGINIA.

AUTOMATIC VALVE FOR FLUSH TANKS.

1,420,713.  Specification of Letters Patent.  Patented June 27, 1922.

Application filed December 27, 1921. Serial No. 524,815.

*To all whom it may concern:*

Be it known that I, ROBERT L. LASH, a citizen of the United States, residing at Norfolk, in the county of Norfolk and State of Virginia, have invented certain new and useful Improvements in Automatic Valves for Flush Tanks, of which the following is a specification.

My invention relates to improvements in automatic valves for flush tanks.

An object of my invention is to provide a valve of this character which is controlled by a float and in which the valve is so arranged that it may be readily removed from its seat for replacing the gasket, and at the same time provide a cushioning means for regulating the closing of the valve, and thus obviate the noise which usually accompanies the closing of such valves.

Another object of my invention is to provide a valve of this character which is made of two parts and so arranged that it may be readily assembled and so arranged that the float may be attached at different points and the throw of the valve may be changed to insure the closing of the valve upon the wearing of the washer so that the tank cannot overflow.

A still further object of my invention is to provide a simple, cheap, and effective valve of this character which has certain details of structure and combination of parts hereinafter more fully set forth.

In the accompanying drawings—

Figure 1 is a vertical sectional view of my improved valve in a closed position;

Figure 2 is a vertical sectional view of my improved valve in an open position;

Figure 3 is an end view looking in the direction of the arrow, Fig. 2, and showing the float attached to the valve;

Figure 4 is an end view showing a modified form of means for attaching float to the valve; and Figure 5 is a detail vertical sectional view showing the guard carried by the valve.

Referring now to the drawings, 1 represents a chamber which is placed in the flush tank 2 of a water-closet and rests on the bottom of the tank and which has an externally threaded nipple 3 arranged in its lower face intermediate its ends which extends through the tank and is connected to a water supply not shown. While I have described my invention as applied to a water-closet flush tank, it will be readily understood that the same may be used in any tank to regulate the water level therein.

The chamber 1 has one end thickened, as indicated at 4, and its opposite end 5 open and provided with an annular semi-circular beading 6 adapted to bear against the packing of the valve and form a tight joint, as will be hereinafter more fully described. The thickened end 4 of the chamber 1 is provided with a threaded recess 7, into which is screwed the threaded portion 8 of the valve stem 9. Said stem carries at its outer end a valve 10, which, as shown, is of disk form and has an annular recess 11 in its inner face, in which is arranged the gasket 12, of rubber or the like.

The outer periphery of the valve 10 is provided with a series of openings 13, into one of which is screwed the rod 14 carried by a float 15, so that an adjustment of the float is obtained to give it a greater or less throw and so that it can be adjusted to insure the proper oscillation of the valve to cause the gasket to firmly bear against the beading 6 and completely close off the discharge of water from the chamber 1 to the tank.

The chamber 1 at the upper portion of the open end is provided with a horizontally arranged flange 16 which extends over the valve 10 so that when the valve is in its outermost position the inner face of the valve is within the flange whereby a guard is formed to prevent the water in its passage from the chamber from squirting upwardly.

In the modification shown in Figure 4, the end of the valve is provided with a split sleeve like extension 17, split as indicated at 18, and having the oppositely arranged openings 17' and 18. The opening 17' is screwthreaded and the float rod 19 passes loosely through the hole 18 and is screwed into the opening 17'. The rod 14 is provided with a lug 20 which engages one portion of the split sleeve and draws the opposite portions of the same together.

In the modification shown in Fig. 5, instead of the chamber 1 carrying the guard, the same is carried by the valve 10 and is in the form of an annular flange 21 which extends over the outer end of the chamber to accomplish the same result as described in respect to the guard 16.

From the foregoing description, it will be seen that I have produced a very simple automatic cut-off for tanks, in which the valve proper is made of only two parts, the chamber or housing and the valve and its stem. When applied, and the tank in which the valve is arranged is empty, the valve is in the position shown in Figure 2 of the drawings and as the water rises in the tank, the float moves up causing an oscillation of the valve, and owing to the pitch of the threads 7 on the valve stem, the valve is rapidly moved in toward the chamber. In this movement, the water pressure in the chamber is exerting pressure on the valve and forming a cushion and prevents any chattering usually found in such valves.

When the gasket becomes worn, all that is necessary to replace it is to detach the float, by unscrewing the rod 14, and then unscrewing the valve stem from the threaded recess in the chamber and the gasket 11 may be removed from the recess in the valve, over the valve stem, and another gasket slipped over the stem into the recess.

Having thus described my invention, what I claim as new and desire to secure by Letters Patent, is:

1. A valve of the character described comprising a chamber having an open end, a water supply intermediate the ends, a valve closing said open end and having a stem extending through said end and screwed into the opposite end of the chamber, and a float attached to said valve for oscillating the same whereby it is closed and opened.

2. A valve of the character described comprising a chamber having an open end, a water supply intermediate the ends, a valve closing said open end and having a stem extending through said end and screwed into the opposite end of the chamber, and a float adjustably attached to said valve for oscillating the same whereby it is adapted to be closed and opened by rise and fall of the water in a tank.

3. A valve of the character described comprising a chamber having an open end, a water supply intermediate the ends, a disk valve closing the open end of the chamber and having a stem and an annular recess on its inner face, a gasket frictionally held in said recess, a screw threaded connection between the stem and chamber, and a float secured to the valve and adapted to oscillate the same for opening and closing it.

4. A valve of the character described, comprising a chamber having an opening in one end, a water supply intermediate its ends, a valve closing said opening and having a stem extending therethrough and in operative connection with the chamber, a guard carried by the chamber and extending outwardly over the valve and spaced therefrom, and means for oscillating said valve, whereby the chamber forms a cushion for the valve in its closing movement.

5. A valve of the character described comprising a stationary valve body having an inlet and an outlet, a movable valve body adapted to close said outlet, means on said movable valve body extending through said outlet and into cooperative engagement with the interior of said stationary valve body, and a guard on one of said valve bodies to prevent a vertical discharge of the fluid passing through and from the valve.

6. A valve of the character described comprising a stationary valve body having an inlet and an outlet, a movable valve body for closing said outlet, and a gasket therefor, said movable valve body having a portion projecting integrally therefrom through said gasket and into the outlet opening, said portion and the stationary valve body having cooperating cam surfaces whereby movement of the movable valve body guides the bodies relatively axially of each other to cause the opening and closing of the valve.

In testimony whereof I have affixed my signature.

ROBERT L. LASH.